July 6, 1965　　　　J. H. FLAHERTY　　　　3,193,054
METHOD OF LUBRICATING GAS BEARINGS
Filed April 10, 1963　　　　　　　　　　　　3 Sheets-Sheet 1

INVENTOR.
James H. Flaherty
BY
ATTORNEY

July 6, 1965

J. H. FLAHERTY 3,193,054

METHOD OF LUBRICATING GAS BEARINGS

Filed April 10, 1963

INVENTOR.
James H. Flaherty
BY
B. N. Shampo
ATTORNEY

INVENTOR.
James H. Flaherty
BY
G. N. Shampo
ATTORNEY.

United States Patent Office 3,193,054
Patented July 6, 1965

3,193,054
METHOD OF LUBRICATING GAS BEARINGS
James H. Flaherty, Hales Corners, Wis., assignor to General Motors Corporation, Detroit, Mich., a corporation of Delaware
Filed Apr. 10, 1963, Ser. No. 272,023
16 Claims. (Cl. 184—6)

This invention relates generally to gas bearings such as those which are used in gyroscope assemblies and similar devices to provide a load-supporting, self-generating film of gas between the relatively moving parts of the bearings. More particularly, this invention relates to a method of providing intermittent supplementary lubrication to a gas bearing assembly to prevent wearing and galling of the bearing surfaces during the starting and stopping periods of bearing operation.

Gas bearings have been widely used in industry in place of ball or roller bearings in an array of applications where minimum bearing vibration is required. Gas bearing assemblies also have much lower frictional bearing resistance in operation than ball bearing assemblies. Consequently, gas bearings are widely used in gyroscopic applications in which the self-generating gas film of the gas bearing supports the high-speed rotating gyroscope rotor.

In gyroscopic applications, any wearing or galling of the bearing surfaces of the gas bearing assembly has an adverse effect on the stability and balance characteristics of the gyroscope. This, of course, detracts from the precision and accuracy qualities of the gyroscope, which are essential to proper gyroscope operation. Therefore, it is very important in a gas bearing gyroscope to maintain the load-supporting gas film between the bearing surfaces of the relatively high-speed rotating rotor support journal and the stationary bearing support member in order to prevent the bearing surfaces from frictionally engaging during gyroscope operation.

The load-supporting gas film in a gas bearing is formed by a self-generating mechanism during gyroscope operation. The rotating rotor support journal drags the gas from the surrounding environment into the annular space between the journal and the bearing support member until the pressure of the gas film in the space is sufficient to support the load carried by the journal. When rotation of the rotor is maintained at a constant speed after it has attained a sufficient rotational speed to be supported by the gas film, the opposing forces on the annular gas film become balanced, and the gas bearing attains a hydrodynamic state of equilibrium.

However, this hydrodynamic state of equilibrium becomes unbalanced when the rotation of the rotor is slowed or stopped. When deceleration occurs, the pressure of the load-supporting gas film decreases until it is insufficient to support the load carried by the journal, and the rotating journal frictionally engages the bearing surface of the support member. This, of course, causes wearing and galling of the bearing surfaces which results in the malfunctioning of the gyroscope due to the previously mentioned stability and balance problems associated with gyroscope operation.

The bearing surfaces of the journal and support member are similarly subjected to wearing and galling when the gyro rotor is started to rotate from a stopped position. When the gyroscope rotor begins to rotate, the rotor support journal frictionally engages the bearing surfaces of the bearing support member, since the self-generating, load-supporting gas film is formed only at higher speeds of rotation. In the past, various devices such as air hoses and special sealing equipment has been used to force air through a porous bearing material to lubricate the bearing and prevent wearing and galling of the bearing surfaces during the start-up period. However, these devices contribute to the balance problems of the gyroscope and are relatively expensive and difficult to install and operate. Thus, it is desirable to prevent wearing and galling of the bearing surfaces by lubricating these surfaces in a gas bearing gyroscope during the starting and stopping periods of gyroscope operation by a simple and effective means which is easy to install and operate.

Therefore, it is a principal object of the present invention to provide a simple and effective method of lubricating the bearing surfaces of a gas bearing assembly in a gyroscope or similar device during the starting and stopping periods of bearing operation to prevent excessive wearing and galling of the bearing surfaces during these periods.

It is another object of the present invention to provide an improved method of lubricating the bearing surfaces of a gas bearing assembly by using a reversible cycle of the gas and liquid states of a fluid working medium.

It is a further object of the present invention to provide a lubrication system utilizing a thermoelectric means to alternately vaporize and condense a lubricant or working fluid to lubricate the bearing surfaces of a gas bearing assembly during bearing operation.

In accordance with this invention, these and other objects are accomplished by providing a supplementary lubrication system for lubricating the bearing surfaces of a gas bearing assembly in a gyroscope or similar device during the starting and stopping periods of bearing operation. This invention contemplates a lubrication system utilizing the vapor and liquid states of a fluid lubricant or working medium in a reversible cycle. The lubricating fluid is alternately vaporized and condensed by thermoelectric means to provide a lubricating vapor to the bearing surfaces during the starting and stopping periods of bearing operation.

Other objects and advantages of my invention will more fully appear from the following detailed description, reference being made to the accompanying drawings, in which.

Figure 1:
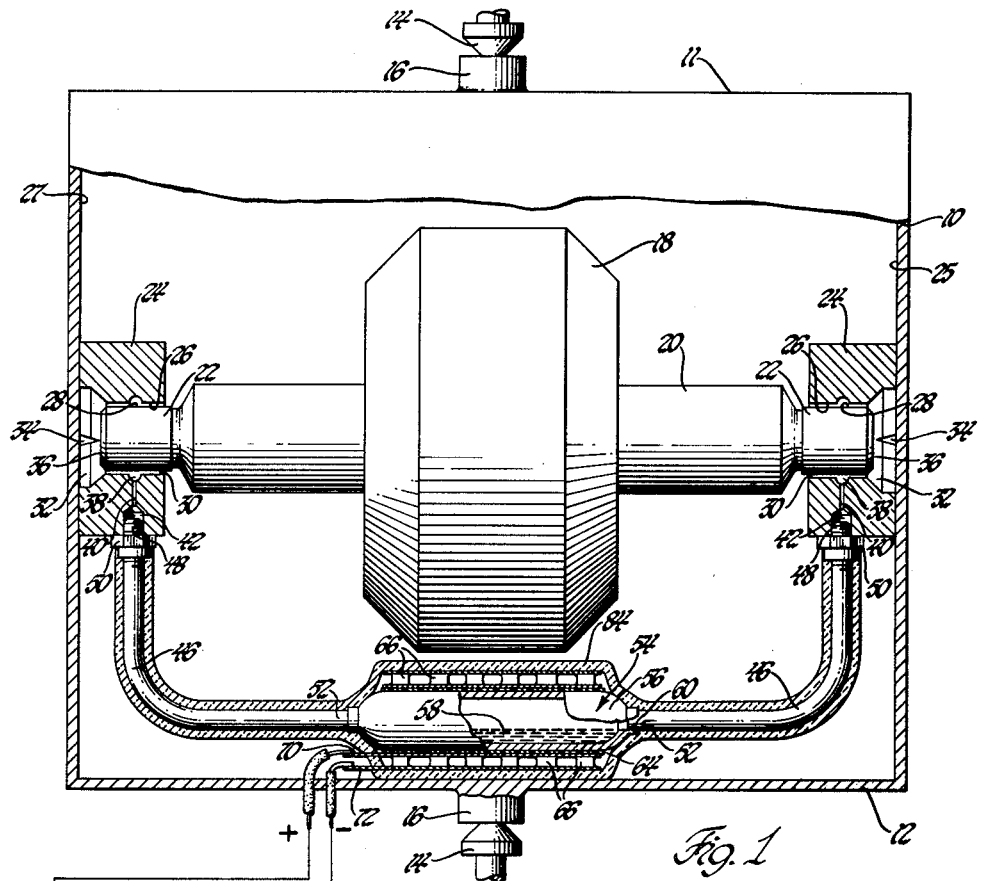
FIGURE 1 is a horizontal elevational view, with parts broken away and in section, of a gas bearing gyroscope assembly embodying the present invention, wherein the rotor, in operation, is supported by a self-generating gas film and liquid lubricant is stored in the reservoir.
Figure 2:
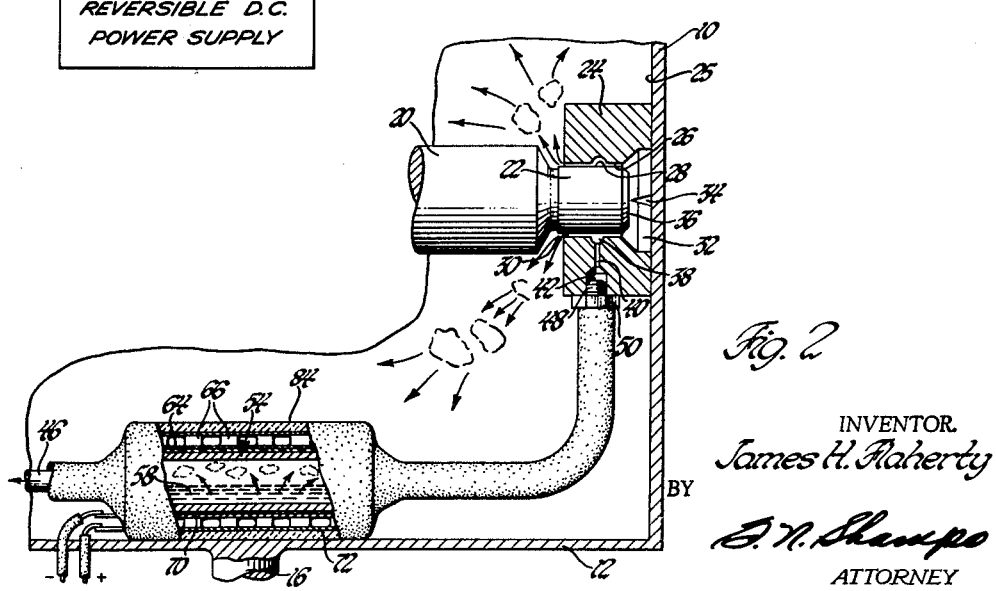
FIGURE 2 is a fragmentary horizontal elevational view, with parts broken away and in section, of the gyroscope assembly shown in FIGURE 1, wherein the rotor is decelerating and the lubricating fluid in the reservoir is being vaporized to provide a lubricating vapor at the bearing surfaces of the rotor support journal and bearing support member.
Figure 3:
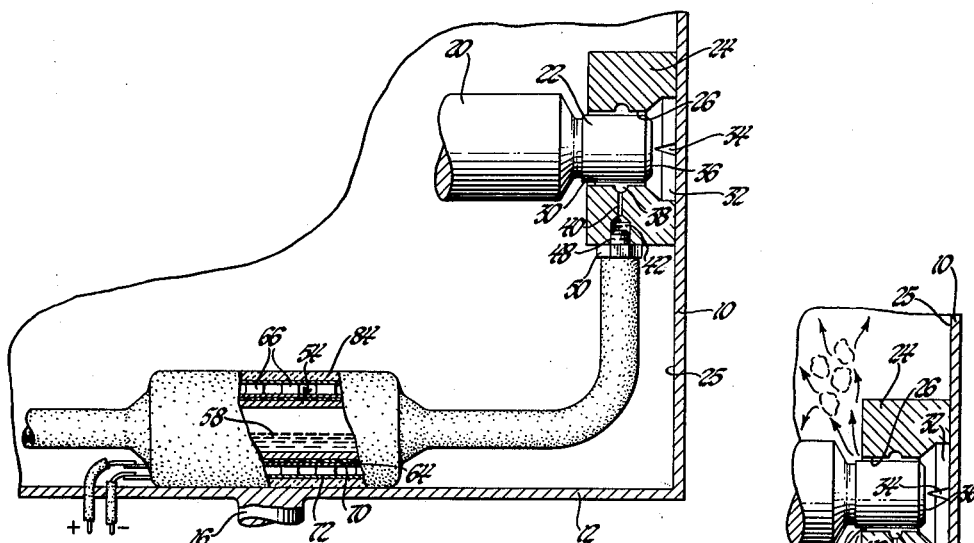
FIGURE 3 is a view similar to FIGURE 2 except that the rotor is stopped and the unvaporized lubricating fluid in the reservoir is being stored as a liquid.
Figure 4:
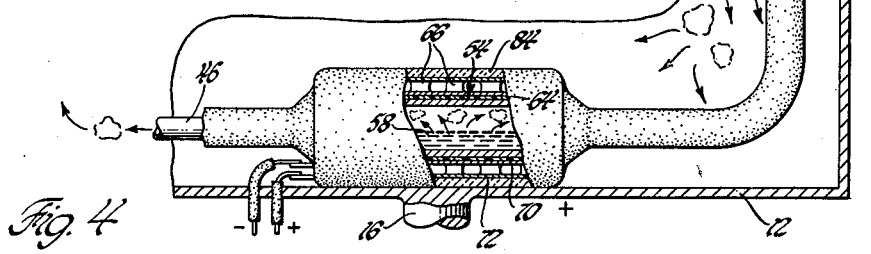
FIGURE 4 is a view similar to FIGURES 2 and 3 except that the rotor is accelerating from a stopped position and the remaining lubricating fluid in the reservoir is being vaporized to provide an initial lubricating film of vapor to the bearing surfaces during the start-up period.
Figure 5:
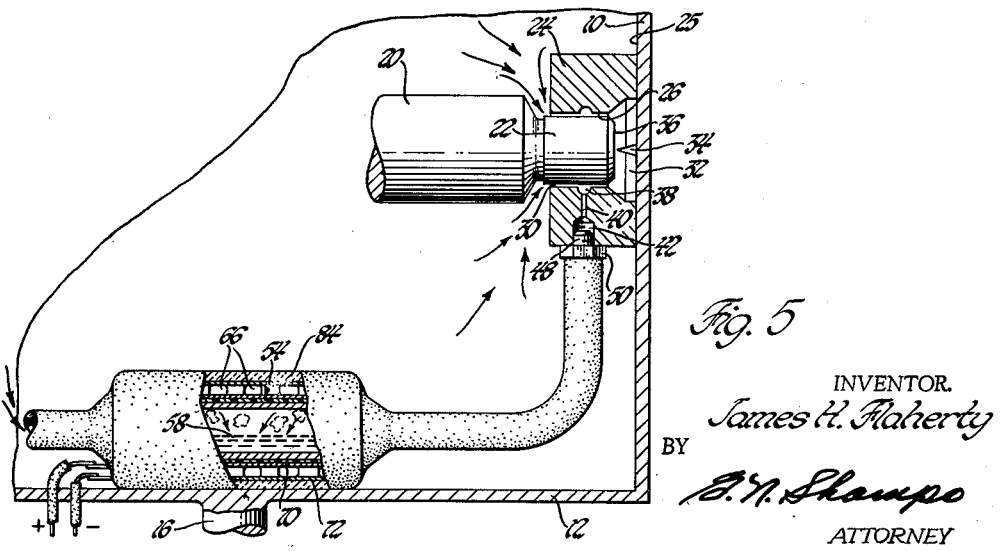
Figure 6:
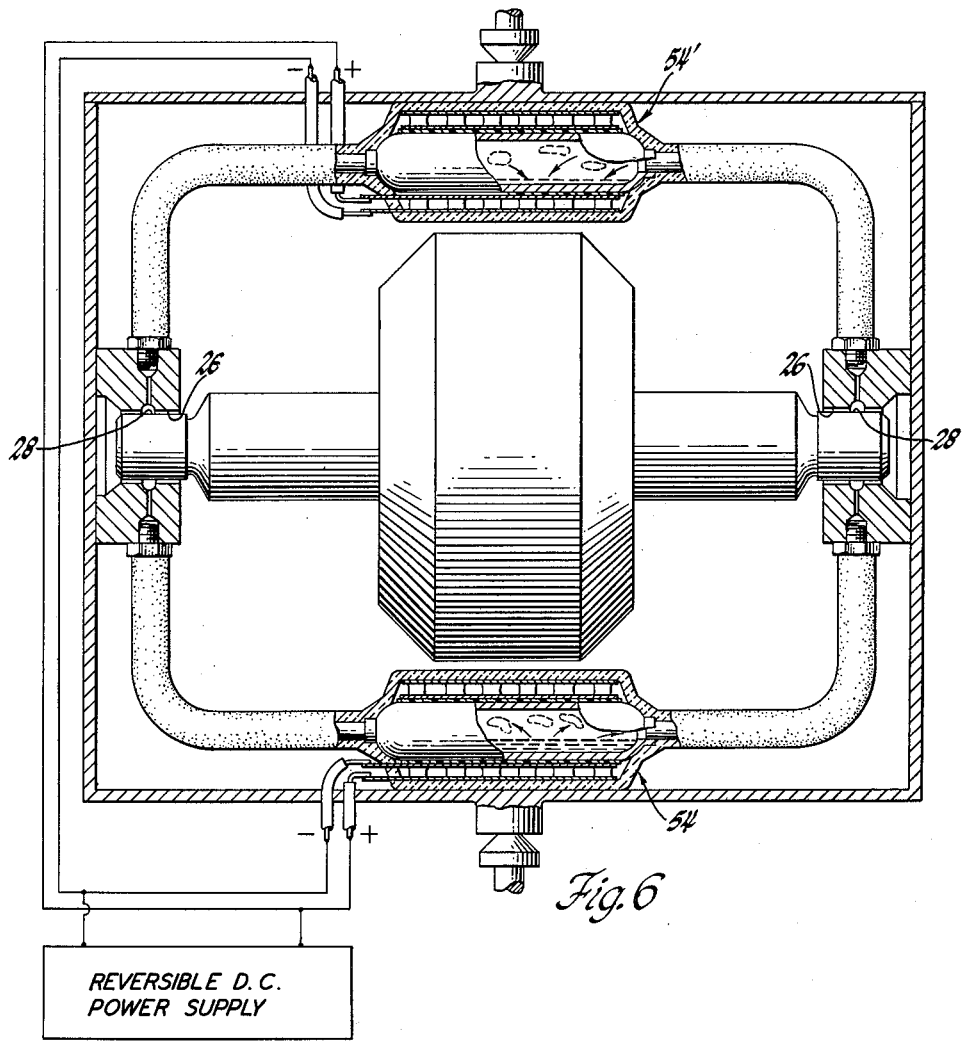

FIGURE 5 is a view similar to FIGURES 2, 3 and 4 except that the rotor is spinning at its normal operating speed and the reservoir is being recharged with the fluid lubricant after the gas bearing has attained the hydrodynamic state; and FIGURE 6 is a view similar to FIGURE 1 except that two lubricant reservoirs are employed to provide continuous lubrication to the gas bearing gyroscope assembly during operation.

As shown in FIGURE 1 of the drawings, the gyroscope assembly includes an enclosed gas-tight housing 10 having opposite walls 11 and 12 mounted on coaxially aligned gimbal pins 14 by means of trunnions 16 extending from the walls, so that the housing is free to rotate about the axis of these pins.

A gyroscope rotor 18 is mounted on a shaft 20 having journal portions 22 rotatably supported by bearing support members 24, each of which is secured to one of the opposite end walls 25 and 27 of the housing 10, so that the bearing axis is perpendicular to the axes of the coaxially aligned gimbal pins 14. The two bearing support members are of similar construction and like parts are therefore designated by the same reference numeral.

The bearing support members 24 are provided with cylindrical radial thrust bearing surfaces 26. Clearances between these bearing surfaces and the adjacent cylindrical surfaces 28 of the journals 22 should be sufficiently small so that a radial spin gas bearing action occurs in the annular spaces 30 formed by these surfaces during gyroscope operation. The rotor 18 preferably is driven at high speeds during gyroscope operation by any suitable means such as an electric motor, which is not shown in the drawings.

The axially extending openings in the bearing support members 24 are enlarged at their outer ends 32, and a needle point thrust bearing 34 is affixed to each of the housing walls 26 and 27 within these enlarged portions of the openings. The thrust bearings preferably are co-axial with the journals 22 but are spaced slightly from the adjacent end surfaces 36 of the journals to limit axial movement of the rotor shaft and prevent unbalancing of the gyroscope during operation.

The radial thrust bearing surfaces 26 of the bearing support members 24 preferably are provided with shallow annular grooves 38. As will hereinafter be more fully explained, the fluid lubricant is conveyed to and from the bearing surfaces through these grooves during the operation of the gyroscope. The grooves 38 are connected by radially extending internal passages 40 of small diameter to larger diameter threaded external openings 42 in the bearing support members 24. Conduits 46 having threaded ends 48 are connected to these external openings, the ends 48 of the conduits being locked in place by any suitable means such as lock nuts 50. The opposite ends 52 of the conduits are connected to the lubricating fluid reservoir 54 which is located within the housing 10 and suitably fastened to the wall 12 of the housing. The reservoir preferably is balanced across the axes of the gimbal pins 14 and more than one reservoir can be used in accordance with the present invention. Also, the reservoirs can be suitably located outside the housing as well as within the housing.

The lubricant reservoir 54 includes a generally cylindrical metal accumulator tank 56 in which the fluid lubricant 58 is stored. As will hereinafter be more fully explained, the lubricant is condensed and vaporized within the accumulator tank during the gyroscope operation. An opening is provided at each end of the tank to permit the conveyance of the fluid lubricant to and from the tank. Each of the conduits 46 has one end suitably fastened in fluid-tight relationship to a corresponding opening 60 at the adjacent end of the tank.

The outer cylindrical surface of the tank 56 is provided with a dielectric film 64 which preferably is made of a plastic material having low thermal resistance but high electrical resistance. A plurality of electrically connected thermocouple modules 66 are affixed to the film 64 in any suitable configuration around the tank 56 to insure uniform heat flow between the modules and the fluid lubricant 58 in the tank. In operation, the hot junction temperature of the thermocouple modules should be sufficiently high to vaporize the liquid lubricant in the tank, and the cold junction temperature of the modules should be sufficiently low to condense the lubricant vapor in the tank. Any type of thermocouple module having the desired operating characteristics may be used, but I have found N- and P-type bismuth telluride alloy thermocouple modules to be especially suitable. The operating temperature range for a typical thermocouple module of this type extends from a maximum hot junction temperature of about 150° C. to a minimum cold junction temperature of approximately 75° C. The maximum current which can be used for cooling and heating with such a thermocouple module is about 40 amperes. The modules are electrically connected in series to each other, and the terminal modules are electrically connected to a reversible direct current power supply by electrical leads 70 and 72.

The thermocouple modules, which utilize the well-known Peltier effect, can be caused to either heat or cool the fluid lubricant in the tank 56 by simply reversing the direction of current flow through the modules. As previously mentioned, the electrical insulating film 64 should have good heat flow characteristics to facilitate the transfer of heat to and from the fluid lubricant in the tank. Also, the film should have minimum electrical conductance to prevent dissipation of the electric current within the assembly.

The tank 56 and the thermocouple modules 66 are enclosed by a casing of thermal insulating material 84 so that the heating and cooling effects of the thermocouple assembly are concentrated on the fluid lubricant within the tank. The insulation 84 may be made of rigid polyurethane foam or other suitable insulating material.

The fluid lubricant 58 used in lubricating the bearing surfaces of the gas bearing assemblies should have good lubricating qualities in both the liquid and vapor phases. The fluid must have good heat transfer properties, thermal stability and high evaporation rates, as well as being non-corrosive and easy to handle. While there are several types of lubricants and fluids possessing the above-mentioned properties in varying degrees, I have found that fluorochemical compounds of the "Freon" or related types are the most suitable materials for use in the present invention.

An example of an appropriate fluorochemical lubricant is Inert Fluorochemical Liquid FC-75 produced by the Minnesota Mining and Manufacturing Company of St. Paul, Minnesota. This material consists principally of isomers of perfluoro cyclic ether ($C_8F_{16}O$) and has a pour point of approximately minus 80° F., a boiling point of approximately 214° F. and a heat of vaporization of 37.8 B.t.u. per pound at its boiling point. The specific heat of FC-75 in the liquid state at 77° F. is 0.248 B.t.u. per pound per degree Fahrenheit, and it has a specific heat in the vapor state of 0.236 B.t.u. per pound per degree.

In FIGURE 1 of the drawings, the rotor 18 is shown as spinning at the normal operating rate. When the gyroscope is operating at this speed, the gas bearings have attained a hydrodynamic state, and the load carried by each of the journals 22 is supported by a self-generating gas film in the annular space 30. At normal operating speed, the temperature within the housing 10 is maintained above the boiling point of the lubricant 58 to prevent condensation of the lubricant within the housing. Thus, the housing is filled solely with the vapor phase of the lubricant so that the gyroscope assembly does not become unbalanced due to the accumulation of liquid lubricant within the housing.

FIGURE 1 of the drawings shows the lubricant 58 stored in the reservoir 54 as a liquid at normal gyroscope operating speed. This is accomplished by maintaining the temperature of the lubricant in the insulated reservoir below the boiling point of the lubricant by utilizing the cooling effect of the thermocouple assembly. The polarity of the electrical leads 70 and 72 shown in FIGURE 1 indicates that the thermocouple assembly is refrigerating. Thus the liquid lubricant is stored in the reservoir while the gyroscope is running at its normal operating speed.

Referring to FIGURE 2, the rotor is shown as decelerating or stopping. When this occurs, the pressure of the load-supporting gas film in the annular space 30 drops off rapidly until it is insufficient to support the load carried by the journal 22. When the rotor starts to decelerate, the polarity of the power supply to the thermocouple assembly is reversed to rapidly heat the liquid lubricant 58 in the reservoir 54. When the liquid lubricant 58 in the reservoir 54 is heated to the boiling point, it becomes vaporized, and the vapors are conveyed from the reservoir through the conduit 46 into the annular groove 38 of the bearing support member 24. As the heating continues, the lubricant vapors flow from the groove 38 through the annular space 30 and into the housing 10. Thus the lubricant vapors provide a lubricating film in the annular space 30 between the cylindrical surface 28 of the journal 22 and the bearing surface 26 of the support member 24. This lubricating film prevents galling and wearing of the journal and bearing surfaces during the deceleration or stopping of the rotor. During the deceleration of the rotor, the vaporization of the lubricant 58 in the reservoir 54 is controlled so that the rotor is stopped before all of the lubricant in the reservoir is vaporized. Thus, a sufficient amount of liquid lubricant remains in the reservoir to lubricate the bearing surfaces when the rotor is started from a stopped position.

The rotor is stopped in the view shown in FIGURE 3, and the power supply to the thermocouple assembly has reversed to cool the remaining liquid lubricant 58 in the reservoir 54. Thus, the remaining lubricant in the reservoir is stored as a liquid when the gyroscope is not operating.

In FIGURE 4 of the drawings, the rotor is shown as beginning to rotate. On starting, the rotational speed of the journal 22 is insufficient to generate a load-supporting gas film in the annular space 30 between the journal surface 28 and the bearing surface 26. Without the present invention, wearing and galling of these surfaces during the starting operation would result. To prevent wearing and galling of these surfaces, the polarity of the power supply to the thermocouple assembly is reversed before the rotor begins to spin so that the remaining liquid lubricant 58 in the lubricant reservoir 54 is vaporized and a lubricating vapor is supplied to the bearing surfaces during the acceleration period. Thus, the present invention provides a simple and effective method of lubricating the bearing surfaces of a gas bearing gyroscope to prevent wearing and galling of these surfaces during the starting operation.

Referring now to FIGURE 5 of the drawings, the rotor is shown as having attained its normal operating speed and the journal 22 is spinning on a load-supporting, self-generating gas film in the annular space 30 between the journal surface 28 and the bearing surface 26 of the bearing support member 24. After the hydrodynamic state is attained, the polarity of the power supply to the thermocouple assembly is reversed so that the lubricant vapor in the reservoir 54 is condensed to recharge the reservoir with the liquid lubricant 58. As the lubricant vapors in the reservoir are condensed, a vacuum is created in the reservoir and the lubricant vapors in the housing 10 are drawn through the annular space 30 and the conduit system into the reservoir where they are condensed to recharge the reservoir. Also, the hydrodynamic pressure of the gas film in the annular space 30 aids in recharging the reservoir 58 by forcing the lubricant vapors from the housing into the reservoir where they are condensed. The cooling is continued until a state of equilibrium is attained between the lubricant vapor in the housing and the liquid lubricant in the reservoir. The temperature of the thermocouple assembly is then regulated to maintain this state of equilibrium during normal running operation of the gyroscope. Thus, a reversible cycle lubrication system is provided by the present invention utilizing the vapor and liquid states of a fluid lubricant.

It should be noted, of course, that the condensation of the lubricant vapors always occurs in the precisely located and balanced lubricant reservoir 54 and not at other indefinite locations within the housing 10. Therefore, the temperature within the housing is maintained above the boiling point of the liquid lubricant when the vapor film in the bearing support is functioning as a gas bearing. In this manner, precessional errors due to spurious input are held to a minimum.

In operation, pressure drops due to vaporization and condensation of the fluid lubricant occur primarily in the annular space 30 between the bearing surface 26 of the bearing support member 24 and the cylindrical surface 28 of the journal 22. At these locations, the effects of pressure drops on gyroscope balance are compensated for by proper gyroscope assembly design, which will depend on the fluid lubricant being used and the pressure conditions involved.

The FC-75 lubricant or working fluid has a heat of vaporization of approximately 3600 watt-seconds per mole. Thus, a mole of the lubricant fluid can be vaporized or condensed by using twenty-four N- and P-type bismuth telluride thermocouple modules of the type hereinbefore described in the thermocouple assembly and applying a current of about 40 amperes at 35 volts for a one second period. Naturally, the number and type of thermocouple modules which are used will depend on the particular design and operating characteristics of the gyroscope assembly. However, in all cases the thermocouple assembly should be capable of vaporizing the liquid lubricant in the reservoir at a sufficient rate during the starting and stopping periods of gyroscope operation to provide an adequate vaporous lubricating film on the bearing surfaces during these periods.

As shown in FIGURE 6 of the drawings, the present invention also contemplates a gyroscope assembly utilizing two lubricant reservoirs which operate in a similar manner to provide continuous bearing lubrication during gyroscope operation. One reservoir 54 may be used to vaporize the lubricant fluid to provide a lubricating vapor between the bearing surfaces 26 and 28, while the other reservoir 54' simultaneously draws the vapor from the space between these surfaces and condenses it to become recharged with liquid lubricant. The process may be made continuous by simultaneously reversing the cooling and heating effects of the thermocouple assembly in each of two reservoirs at periodic intervals.

Thus, the present invention provides a simple and effective method of lubricating the bearing surfaces of a gas bearing assembly in a gyroscope or similar device during starting or stopping of the rotor to prevent excessive wearing and galling of the bearing surfaces. The lubrication system of the present invention is completely reversible and thus provides a self-sustaining long-life system. The system also is relatively inexpensive and easy to operate, and there is no need to use costly sealing means and air hoses to lubricate the bearing during starting and stopping operations.

While I have shown and described specific embodiments of my invention, it is not to be limited thereby and is intended to encompass all modifications defined by the following claims.

I claim:

1. A method of lubricating a gas bearing assembly to prevent wearing and galling of the bearing surfaces of said assembly during the starting and stopping periods of operation by a reversible cycle lubrication system which comprises vaporizing a liquid fluorochemical lubricant by thermoelectric means, conveying the lubricant vapors to the bearing surfaces of said assembly to provide a vaporous lubricating film on said surfaces during said periods, and subsequently condensing said vapors from said surfaces by said thermoelectric means when said assembly has attained a hydrodynamic state of operation.

2. A method of lubricating a gas bearing assembly during the starting and stopping periods of operation by a reversible cycle lubrication system, said method comprising the steps of vaporizing a liquid lubricant in a lubricant reservoir by thermoelectric means, conveying the lubricant vapors to the bearing surfaces of said assembly during said periods to provide a vaporous lubricating film on said surfaces, collecting said vapors in a gas-tight housing, conveying said vapors from said housing to said reservoir when said assembly has stopped operating and also when said assembly has attained a hydrodynamic state of operation, and condensing said vapors in said reservoir by said thermoelectric means to recharge said reservoir with liquid lubricant.

3. A method of providing continuous lubrication to the bearing surfaces of a gas bearing assembly in a closed system during bearing operation, said method comprising the steps of vaporizing a liquid lubricant in a first lubricant reservoir by thermoelectric means, conveying the lubricant vapors from said first reservoir to said surfaces to provide a vaporous lubricating film on said surfaces, simultaneously conveying said vapors from said surfaces to a second lubricant reservoir, condensing said vapors in said second reservoir by thermoelectric means, and simultaneously reversing the condensation and vaporization process of said first and second reservoirs at periodic intervals to provide a reversible cycle lubrication system.

4. A method of providing a supplementary, reversible cycle, lubrication system to lubricate the gas bearing assembly of a gyroscope during the starting and stopping periods of gyroscope operation, said method comprising the steps of providing a gas-tight gyroscope housing to enclose said assembly and provide a closed lubrication system, vaporizing a liquid lubricant in a lubricant reservoir by thermoelectric means during said periods, providing a conduit means to convey the lubricant vapors from said reservoir to the bearing surfaces of said assembly during said periods to provide a vaporous lubricating film on said surfaces, collecting said vapors forming said film in said housing, conveying said vapors from said housing to said reservoir through said conduit means when said gyroscope has stopped operating and also when said gyroscope has attained a hydrodynamic state of operation, and condensing said vapors in said reservoir by said thermoelectric means to recharge said reservoir with liquid lubricant and make said system reversible.

5. A method of providing a supplementary, reversible cycle, lubrication system to lubricate the gas bearing assembly of a gyroscope during the starting and stopping periods of gyroscope operation, said method comprising the steps of providing a gas-tight gyroscope housing to enclose said assembly and provide a closed lubrication system, vaporizing a liquid fluorochemical lubricant in a lubricant reservoir by thermoelectric means during said periods, providing a conduit means to convey the lubricant vapors from said reservoir to the bearing surfaces of said assembly during said periods to provide a vaporous lubricating film on said surfaces, collecting said vapors forming said film in said housing, conveying said vapors from said housing to said reservoir through said conduit means when said gyroscope has stopped operating and also when said gyroscope has attained a hydrodynamic state of operation, and condensing said vapors in said reservoir by said thermoelectric means to recharge said reservoir with liquid lubricant and make said system reversible.

6. A method as recited in claim 5 in which the fluorochemical lubricant used principally comprises isomers of perfluoro cyclic ether having the empirical formula $C_8F_{16}O$.

7. A device for lubricating the bearing surfaces of a gas bearing assembly during the starting and stopping periods of operation by a reversible cycle lubrication system to prevent wearing and galling of said surfaces during said periods which comprises thermoelectric means for vaporizing a fluorochemical lubricant in a lubricant reservoir, means for conveying the lubricant vapors from said reservoir to said surfaces to provide a vaporous lubricating film on said surfaces during said periods, and means for causing said thermoelectric means to condense said vapors and cause said vapors to be reconveyed to said lubricant reservoir from said surfaces when said assembly has attained a hydrodynamic state of operation to recharge said reservoir with said lubricant.

8. A device for lubricating a gas bearing assembly during the starting and stopping periods of bearing operation, comprising a lubricant reservoir having thermoelectric means for vaporizing a liquid lubricant, means for conveying the lubricant vapors from said reservoir to the bearing surfaces of said assembly to provide a vaporous lubricating film on said surfaces during said period, means for collecting said vapors forming said film, and means for causing said vapors to be reconveyed from said collecting means to said reservoir by causing said thermoelectric means to condense said vapors in said reservoir, thereby recharging said reservoir with said liquid lubricant.

9. A device for providing continuous lubrication to the bearing surfaces of a gas bearing assembly during bearing operation, said device comprising two lubricant reservoirs having a thermoelectric means for simultaneously and alternately vaporizing and condensing a fluid lubricant in said reservoirs, means for simultaneously reversing the condensation and vaporization processes in said reservoirs, means for conveying the lubricant vapors to and from said reservoirs over said bearing surfaces to provide a continuous lubricating film on said surfaces during bearing operation, and means for enclosing said bearing assembly to provide a closed reversible cycle lubrication system.

10. A device for lubricating a gas bearing assembly of a gyroscope during the starting and stopping periods of gyroscope operation, said device comprising a reservoir for storing a fluid fluorochemical lubricant in both liquid and vapor states, a thermoelectric means connected to said reservoir for vaporizing the liquid portion of said lubricant, conduit means for conveying lubricant vapors from said reservoir to the bearing surfaces of said assembly during said periods to provide a vaporous lubricating film on said surfaces, a gas-tight housing enclosing said assembly to collect said vapors forming said film, and means for causing said vapors to be reconveyed from said housing to said reservoir by causing said thermoelectric means to condense said vapors in said reservoir, thereby recharging said reservoir with liquid lubricant and providing a reversible cycle lubrication system.

11. A gyroscope assembly comprising a rotor mounted on a shaft, each end of said shaft having a cylindrical journal portion rotatably supported by a gas bearing assembly within a gimbaled gas-tight housing, said rotor being capable of causing a radial spin gas bearing action to occur in each of said bearing assemblies to support the load carried by said journals when said rotor is spinning during gyroscope operation, thrust bearings located adjacent the radial end surfaces of said journals to limit the lateral movement of said shaft within said housing, a lubricant reservoir for storing a fluid lubricant in both the liquid and vapor states, said reservoir including a tank to hold said lubricant, a thermocouple assembly comprising a plurality of electrically connected thermocouple modules secured to a dielectric film located on said tank, said film having good heat flow properties but low electrical conductance, a reversible direct current power supply electrically connected to said thermocouple assembly to cause said modules to alternately vaporize and condense said lubricant in said reservoir by the Peltier effect when the polarity of said power supply to said thermocouple assembly is reversed, and conduit means between said reservoir and bearing assemblies for alternately conveying the lubricant vapors to and from said reservoir and the load-carrying surfaces of each of said bearing assemblies, said vapors providing a vaporous lubricating film on said surfaces during the starting and stopping periods of gyroscope operation when said lubricant is being vaporized in said reservoir and said vapors being condensed in said reservoir to recharge said reservoir with liquid lubricant and provide a reversible cycle lubrication system when said gyroscope has stopped operating and also when said gyroscope has attained a hydrodynamic state of operation.

12. A gyroscope assembly as recited in claim 11 in which the lubricant is a fluorochemical compound.

13. A gyroscope assembly as recited in claim 11 in which the lubricant principally comprises isomers of perfluoro cyclic ether having the empirical formula $C_8F_{16}O$.

14. A gyroscope assembly as recited in claim 11 in which the thermocouple modules comprise N- and P-type bismuth telluride thermoelectric elements.

15. A method of lubricating a gas bearing assembly during operation by a reversible cycle lubrication system which comprises vaporizing a liquid lubricant by thermoelectric means, conveying the lubricant vapors to the bearing surfaces of said assembly to provide a vaporous lubricating film on said surfaces when said assembly has not attained a hydrodynamic state of operation, and subsequently condensing said vapors by said thermoelectric means when said assembly has attained a hydrodynamic state of operation.

16. A device for lubricating a gas bearing assembly during operation by a reversible cycle lubrication system which comprises thermoelectric means for vaporizing a liquid lubricant in a lubricant reservoir, means for conveying the lubricant vapors from said reservoir to the bearing surfaces of said assembly to provide a vaporous lubricating film on said surfaces when said assembly has not attained a hydrodynamic state of operation, and means for causing said thermoelectric means to condense said vapors from said surfaces to recharge said reservoir with liquid lubricant after said assembly has attained a hydrodynamic state of operation.

References Cited by the Examiner

UNITED STATES PATENTS

| | | | |
|---|---|---|---|
| 2,664,173 | 12/53 | Karig | 184—6 |
| 2,948,355 | 8/60 | Hull | 184—6 |
| 3,058,785 | 10/62 | Steele | 308—9 |

LAVERNE D. GEIGER, *Primary Examiner.*

MILTON KAUFMAN, *Examiner.*